(12) United States Patent
Yin et al.

(10) Patent No.: US 10,984,224 B2
(45) Date of Patent: Apr. 20, 2021

(54) FACE DETECTION METHOD

(71) Applicant: Zhuhai Eeasy Technology Co., Ltd., Zhuhai (CN)

(72) Inventors: Xucheng Yin, Zhuhai (CN); Bowen Yang, Zhuhai (CN); Chun Yang, Zhuhai (CN)

(73) Assignee: ZHUHAI EEASY TECHNOLOGY CO., LTD., Zhuhai (CN)

( * ) Notice: Subject to any disclaimer, the term of this patent is extended or adjusted under 35 U.S.C. 154(b) by 13 days.

(21) Appl. No.: 16/726,961

(22) Filed: Dec. 26, 2019

(65) Prior Publication Data
US 2021/0056293 A1 Feb. 25, 2021

(30) Foreign Application Priority Data

Aug. 19, 2019 (CN) .......................... 201910761999.4

(51) Int. Cl.
*G06K 9/00* (2006.01)
*G06T 7/73* (2017.01)
(Continued)

(52) U.S. Cl.
CPC ..... *G06K 9/00288* (2013.01); *G06K 9/00241* (2013.01); *G06K 9/00281* (2013.01);
(Continued)

(58) Field of Classification Search
CPC .......... G06K 9/00288; G06K 9/00241; G06K 9/00281; G06K 9/4671; G06K 9/00067;
(Continued)

(56) References Cited

U.S. PATENT DOCUMENTS 10,635,891 B2 * 4/2020 El-Khamy ......... G06K 9/00268
10,929,644 B2 * 2/2021 Wang ....................... G06N 3/02
(Continued)

OTHER PUBLICATIONS

Chang Huang et al., High-Performance Rotation Invariant Multiview Face Detection, IEEE Transactions on Pattern Analysis and Machine Intelligence, Apr. 2007, pp. 671-686, vol. 29, No. 4.
(Continued)

*Primary Examiner* — Wesley J Tucker
(74) *Attorney, Agent, or Firm* — Bayramoglu Law Offices LLC

(57) ABSTRACT

A face detection method includes scaling an input image to images of various sizes according to certain proportions by means of an image pyramid; passing the resultant images through a first-level network in a sliding window manner to predict face coordinates, face confidences, and face orientations; filtering out the most negative samples by confidence rankings and sending the remaining image patches to a second-level network. Through a second-level network, filtering out non-face samples; applying a regression to obtain more precise position coordinates and providing prediction results of the face orientations. Through an angle arbitration mechanism, combining the prediction results of the preceding two networks to make a final arbitration for a rotation angle of each sample, rotating each of the image patches upright according to the arbitration result made by the angle arbitration mechanism and sending to a third-level network for fine-tuning to predict positions of keypoints.

3 Claims, 2 Drawing Sheets

(51) Int. Cl.
*G06K 9/46* (2006.01)
*G06N 3/04* (2006.01)

(52) U.S. Cl.
CPC ......... *G06K 9/4671* (2013.01); *G06N 3/0454* (2013.01); *G06T 7/74* (2017.01); *G06T 2210/12* (2013.01)

(58) Field of Classification Search
CPC .... G06K 9/00087; G06K 9/42; G06K 9/6268; G06T 7/74; G06T 2210/12; G06N 3/0454
See application file for complete search history.

(56) References Cited

U.S. PATENT DOCUMENTS

| | | | |
|---|---|---|---|
| 2013/0044958 A1* | 2/2013 | Brandt | G06K 9/00248 382/201 |
| 2015/0125049 A1* | 5/2015 | Taigman | G06T 15/205 382/118 |
| 2017/0147905 A1* | 5/2017 | Huang | G06K 9/6232 |
| 2019/0114824 A1* | 4/2019 | Martinez | G06T 7/50 |
| 2019/0205618 A1* | 7/2019 | Jiang | G06N 3/08 |
| 2020/0272806 A1* | 8/2020 | Walker | G06K 9/00261 |
| 2020/0327308 A1* | 10/2020 | Cheng | G06N 3/0481 |
| 2020/0410214 A1* | 12/2020 | Huang | G06N 3/08 |

OTHER PUBLICATIONS

Max Jaderberg et al., Spatial Transformer Networks, 2015.
Xuepeng Shi et al., Real-Time Rotation-Invariant Face Detection with Progressive Calibration Networks, 2018, pp. 2295-2303.
Yi Sun et al., Deep Convolutional Network Cascade for Facial Point Detection, Computer Vision and Pattern Recognition, 2013, pp. 3476- 3483, IEEE Conference on. IEEE.
Zhanpeng Zhang et al., Facial Landmark Detection by Deep Multi-task Learning, ECCV, 2014, pp. 94-108, Part VI, LNCS 8694.
Rajeev Ranjan et al., HyperFace: A Deep Multi-task Learning Framework for Face Detection, Landmark Localization, Pose Estimation, and Gender Recognition, IEEE Transactions on Pattern Analysis & Machine Intelligence, 2018, pp. (99): 1-1.
Wei Liu et al., SSD: Single Shot MultiBox Detector, 2015.
Joseph Redmon et al., You Only Look Once: Unified, Real-Time Object Detection, 2015.
Vidit Jain et al., FDDB: A Benchmark for Face Detection in Unconstrained Settings, Technical Report UM-CS, 2010, 009, University of Massachusetts, Amherst.
Martin Kostinger et al., Annotated Facial Landmarks in the Wild: A Large-scale, Real-world Database for Facial Landmark Localization, IEEE International Conference on Computer Vision Workshops, ICCV, Nov. 6-13, 2011 Workshops, Barcelona, Spain.
Shaoqing Ren et al., Faster R-CNN: Towards Real-Time Object Detection with Region Proposal Networks, 2015.

* cited by examiner

FACE DETECTION METHOD

CROSS-REFERENCES TO THE RELATED APPLICATIONS

This application is based upon and claims priority to Chinese Patent Application No. 201910761999.4, filed on Aug. 19, 2019, the entire contents of which are incorporated herein by reference.

TECHNICAL FIELD

The present invention relates to the field of face detection technology in the field of computer vision, and particularly relates to a face detection method.

BACKGROUND

Face detection has been used in a wide range of applications such as identity authentication, security, media, and entertainment. The face detection issue originates from face recognition, and is a key step in face recognition. Especially in open environments, the diversity of faces in poses, illumination, scales etc., brings huge challenges to face and keypoint detection. In the past ten years, a large number of methods have been developed in the field of computer vision in order to improve the ability of machines to detect human faces. Traditional methods for face detection, according to their implementation mechanism, can be divided into geometric feature-based methods, skin color model-based methods, and statistical theory-based methods. For the geometric feature-based methods, face detection is mainly realized by adopting the geometric features presented by human facial organs. For the skin color model-based methods, it is supposed that there will be a significant distinction between skin colors of human faces and non-face region. For the statistical theory-based methods, statistic analysis and machine learning are employed to find the statistical characteristics of face samples and non-face samples, and then these respective characteristics are adopted to construct classifiers; these methods include subspace methods, neural network methods, support vector machines, hidden Markov model, and Boosting methods. With the unprecedented improvement in computing power and data in recent years, CNN-based methods have completely surpassed the aforementioned traditional methods, wherein many methods have been proposed to solve the problems of face detection in unconstrained environments.

The present invention focuses on the problems of in-plane rotation invariant face and keypoint detection; as compared with pitch and yaw, a face rotated in a plane contains the same semantic information with an upright frontal face, and thus solving these problems is of great significance for subsequent face recognition and face analysis. In order to solve the rotation invariant face detection, Huang Chang proposed a divide-and-conquer strategy in a 2007 paper (Huang C, Ai H, Li Y, et al. High-Performance Rotation Invariant Multiview Face Detection [J]. IEEE Transactions on Pattern Analysis and Machine Intelligence, 2007, 29(4): 671-686), wherein different detectors were applied to faces at different angles, each detector was only robust to faces rotated in a small range, and their comprehensive results were taken as the final prediction output. For the STN (Jaderberg M, Simonyan K, Zisserman A, et al. Spatial Transformer Networks [J]. 2015), rotation invariance of the object is achieved by learning rotation matrices during training; however, this method is only effective for one object at one time. Recently, Shi et al (Shi X, Shan S, Kan M, et al. Real-Time Rotation-Invariant Face Detection with Progressive Calibration Networks[J]. 2018) proposed in a 2018 paper to introduce a cascade scheme that achieves rotation invariance of face detection by learning rotating angles in a coarse-to-fine manner; however, in order to achieve face alignment, additional keypoint information is still required in addition to the detection results.

Sun Yi et al, in their paper (Sun Y, Wang X, Tang X. Deep Convolutional Network Cascade for Facial Point Detection [C]//Computer Vision and Pattern Recognition, 2013 IEEE Conference on. IEEE, 2013), introduced deep learning to face keypoint detection tasks for the first time. For the TCDCN (Zhang Z, Luo P, Loy C C, et al. Facial Landmark Detection by Deep Multi-task Learning [C]//European Conference on Computer Vision. Springer, Cham, 2014), features relevant to the face keypoint, such as expression and genders, were introduced to improve the robustness of keypoint detection. However, these methods are separated from face detection, which makes these methods have greater dependence on the detection results of a previous step. For the HyperFace, (Ranjan R, Patel V M, Chellappa R. HyperFace: A Deep Multi-task Learning Framework for Face Detection, Landmark Localization, Pose Estimation, and Gender Recognition[J]. IEEE Transactions on Pattern Analysis & Machine Intelligence, 2018, PP(99):1-1), more attribute labels were introduced to the training tasks, so as to improve the accuracy of keypoint regression through multi-task learning; however, too much learning tasks lead to more calculations and more running time, and thus, for tasks such as face detection that require high real-time capability, this method obviously has limitations.

Cascade has been widely used in traditional methods, such as the Adboost methods. With the rise of CNN, multi-stage cascaded CNN methods have been developed. Compared with the single-stage methods such as the SSD (Liu W, Anguelov D, Erhan D, et al. SSD: Single Shot MultiBox Detector [J]. 2015) and the YOLO (Redmon J, Divvala S, Girshick R, et al. You Only Look Once: Unified, Real-Time Object Detection [J]. 2015), cascade structures can greatly increase the running speed of the methods without significantly reducing their performance. The principle is that, in cascaded networks, most of the negative samples can be filtered out by the previous network, so that the latter network only focuses on improving the ability to classify hard samples, and thus this strategy can significantly reduce network parameters and calculations.

SUMMARY

In view of the shortcomings of the prior art, an object of the present invention is to provide a face detection method. The detection method realizes the prediction of an in-plane rotation angle of a face while detecting the face, wherein the face can be rotated to upright based on the rotation angle, and thereby regression is applied to obtain the keypoints of facial features.

In order to realize the object of the present invention, the following technical solution is adopted: a face detection method, comprising the following steps:

step 1: by means of an image pyramid, firstly scaling an input image to images of various sizes according to certain proportions, passing the resultant images through a first-level network in a sliding window manner so as to roughly predict face coordinates, face confidences, and face orientations (a face orientation may be: facing up, facing down, facing left, or facing right), filtering out most negative samples by confidence rankings, and sending remaining image patches to a second-level network;

step 2: through the second-level network, further filtering out non-face samples, applying a regression to obtain more precise position coordinates, and providing prediction results of the face orientations;

step 3: through an angle arbitration mechanism, combining the prediction results of the preceding two networks to make a final arbitration for a rotation angle of each sample; and step 4: rotating each of the image patches to upright according to the arbitration result made by the angle arbitration mechanism, and sending to a third-level network for final fine-tuning so as to predict positions of keypoints.

The first-level network and the second-level network each comprises training tasks for a face/non-face classification task, a face bounding box regression task, and an angle classification task; the third-level network comprises training tasks for a face/non-face classification task, a face bounding box regression tasks, and a face keypoint regression tasks.

A face classification loss function $\mathcal{L}_{face}$ is defined as a cross-entropy loss function:

$$\mathcal{L}_{face} = y_f \log \hat{y}_f + (1-y_f)\log(1-\hat{y}_f),$$

wherein, $y_f$ represents a classification annotation of a training sample, the subscript f represents a face classification task; when a positive sample is input, $y_f=1$, otherwise, $y_f=0$; $\hat{y}_f$ is a face classification prediction result; log represents natural logarithm; and an angle classification loss function $\mathcal{L}_{angle}$ is defined as:

$$\mathcal{L}_{angle} = -\Sigma_{j=1}^{T} a_j \log S_j,$$

wherein, $a_j$ represents a rotation direction annotation of training data, when a rotation angle of an input sample falls near a j-th rotation angle, $a_j=1$, otherwise $a_j=0$; in training, T=4 represents four different rotation angles, $S_j$ represents a probability that the network predicts that the input sample falls at the j-th angle; log represents natural logarithm, an Euclidean distance loss function is used for regression of the face bounding box, and regression targets of the bounding box include the following four terms, respectively representing relative offsets of four coordinates:

$$t_{x_1}=(x_1-\hat{x}_1)/\hat{w}, \ t_{y_1}=(y_1-\hat{y}_1)/\hat{h},$$

$$t_{x_2}=(x_2-\hat{x}_2)/\hat{w}, \ t_{y_2}=(y_2-\hat{y}_2)/\hat{h},$$

wherein, $t_{x_1}$ represents a relative offset of an upper left point's abscissa, $t_{y_1}$ represents a relative offset of the upper left point's ordinate, $t_{x_2}$ represents a relative offset of a lower right point's abscissa, $t_{y_2}$ represents a relative offset of the lower right point's ordinate, $\hat{w}$ and $\hat{h}$ represent predicted width and height, $(x_1, y_1)$ and $(x_2, y_2)$ respectively represent coordinates of the upper left point and coordinates of the lower right point of each face box in the training data, and $(\hat{x}_1, \hat{y}_1)$ and $(\hat{x}_2, \hat{y}_2)$ respectively represent the coordinates of the upper left point and the coordinates of the lower right point of the box predicted by the network.

Face keypoint positions are trained by the following keypoint loss function $\mathcal{L}$ and:

$$\mathcal{L}_{land} = \frac{1}{N}\Sigma_{n=1}^{N}\Sigma_{m=1}^{M} w_n(1.5 - \cos(\theta_n))\|d_m^n\|_2^2,$$

wherein, N represents the size of each cluster in the training process, M represents the number of keypoints on each face, $\theta_n$ represents an angle between a line connecting two eyes of the n-th face during training and a horizontal axis of the image, cos represents a Cosine trigonometric function, $d_m^n$ represents a distance between a predicted value and a true value of the m-th keypoint of the n-th face, and $\|*\|_2^2$ represents a second norm; $w_n$ represents a large-pose penalty term, which is calculated as follows: 1) connecting four keypoints other than the nose tip to form four bounding lines; 2) calculating a relative distance c from the nose tip to its nearest bounding line; 3) determining whether the nose tip exceeds the bounding, and 4) if the nose tip is within the bounding, then $w_n=1-c$, otherwise, $w_n=1$.

A threshold is preset in the angle arbitration mechanism; when the prediction results of the second-level network are higher than the threshold, or when the highest confidence of the face orientation prediction results of the second-level network is the same as the highest confidence of the face orientation prediction results of the first-level network, the face orientation prediction result is taken as the final prediction result; otherwise, whether there is an intersection between the face orientation prediction results with top two confidences in the first-level network and the face orientation prediction results with top two confidences in the second-level network are examined, and if so, the intersection is taken as the final prediction result.

The key technical problem to be solved by the present invention is to solve the detection problem of face and its keypoints at any rotation angle in an open environment. In an unconstrained open environment, due to the random relative positional relationship between the imaging device and the face being imaged, the face images may have arbitrary rotation angles. The diversity of rotation brings about the diversity of facial feature expressions, and is accompanied by complex background noise, which brings great challenges to the detection and the subsequent keypoint positioning. The present invention aims to the prediction of an in-plane rotation angle of a face while detecting the face, wherein the face can be rotated to upright based on the rotation angle, and then the keypoints of the facial characteristics is acquired by regression.

Advantages and Beneficial Effects of the Present Invention

The present invention adopts the structure of a cascaded convolutional neural network, integrates face detection and keypoint positioning tasks in a rotation environment, and combines angle prediction and face detection tasks, so as to simultaneously achieve rotation angle and face classification, face bounding box regression and keypoint positioning. The output result of the present invention can realize the alignment of an arbitrarily rotated face to the position of a standard face through a simple similarity transformation. At the same time, the method can achieve real-time operation speed on a general-purpose CPU while maintaining a small-size model, which has important practical significance for mobile computing engineering deployment.

DETAILED DESCRIPTION OF THE EMBODIMENTS

The present invention is further described below in combination with specific embodiments.

Aiming at open application environments, the present invention combines the deep learning method and the idea of cascade, so as to propose a rotation-robust face and keypoint detector. The idea of deep learning has been proven by many methods to have incomparable advantages over other methods in feature extraction. Especially in non-constrained environments, the deep learning-based methods can better realize the extraction of characteristics of massive training samples. In addition, cascade, as a method of thinking that can be traced back to traditional machine learning, has been widely applied in the field of deep learning, especially in the field of face detection and keypoint detection in recent years. In addition, the rotation angle of the face is predicted by means of angle arbitration, and the ability of the method to predict hard samples is improved by introducing an attitude penalty loss function.

Figure 1:
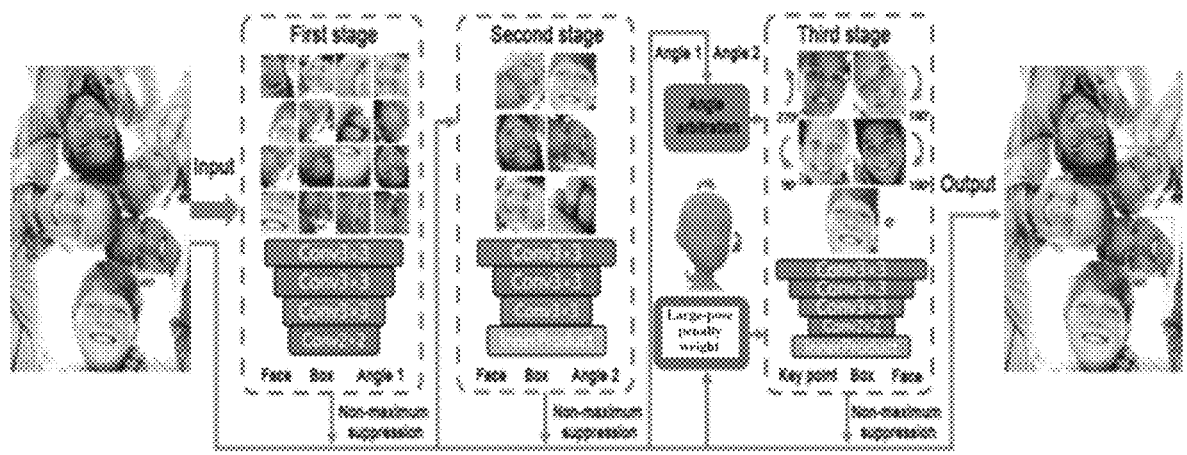
FIG. 1 shows an exemplary flowchart of an overall framework of the present invention.

Here, we first introduce the overall implementation scheme for rotation-invariant. The overall scheme is composed of three sub-networks that are cascaded with each other. The accuracy of face detection is gradually improved through the coarse-to-fine method, as shown in FIG. 1. In particular, during the test process, by means of an image pyramid, an input image is scaled to various sizes according to certain proportions. Then the resultant images are passed through a first-level network in a sliding window manner, so as to roughly predict face coordinates, face confidences, and face orientations (examples: facing up, facing down, facing left, or facing right). Then, most of negative samples will be filtered out according to confidence rankings, and then remaining image patches are sent to a second-level network. The second-level network filters out non-face samples, and more accurate position coordinates are acquired by performing regression; similarly, face orientation prediction results are obtained. Subsequently, an angle arbitration mechanism makes a final arbitration for a rotation angle of each sample by combining the prediction results of the preceding two networks. Finally, each image patch is rotated to upright according to the arbitration result made by the angle arbitration mechanism and sent to the last network for final fine-tuning so as to predict the positions of keypoints. It should be noted that a non-maximum suppression operation may be applied as a post-processing operation at each level to merge highly coincident candidate boxes.

In the present invention, the face and keypoint detection task has been divided into several simple tasks, ensuring the rotation robustness while maintaining the real-time operation speed, which is of great significance for practical applications. In the first-level network and the second-level network, the angle classification is learned in combination with the face/non-face binary (two-class) classification and the regression of the bounding box. The introduction of the rotation angle classification task, on one hand, helps to improve the recall rate of the detection of the rotated face, and on the other hand, improves the regression accuracy of the bounding box because the degree of aggregation of samples in each small range of angles is improved. The present method divides the entire 360 plane equally into four parts, and the first two networks focus on predicting which of the four categories a face's rotation angle belongs to. Compared with the binary classification and the more refined octal (eight-class) classification, the quaternary (four-class) classifications can keep less parameters while guaranteeing a relatively high accuracy. The first-level sub-network uses a fully convolutional network structure, and its main tasks include: extracting candidate boxes from the original image, preliminarily learning the confidence that these candidate boxes containing a face, and applying a regression of the four coordinates of the bounding box. The second-level sub-network selects the samples, whose face confidence is higher than a certain threshold in the prediction results of the previous network, as input; there are still a large number of negative samples among these samples. This stage aims to improve the confidence of positive samples and reduce the confidence of negative samples to achieve the purpose of further removing negative samples; in addition, this network also performs a secondary prediction of the rotation direction of each input sample. After the first two levels, a large number of negative samples have been removed, and each retained sample includes two sets of prediction results of the rotation direction. The angle arbitration mechanism gives the final prediction result of the rotation angle by combining these two sets of outputs.

The training process of this method includes four tasks, which are: face/non-face classification tasks, face bounding box regression tasks, angle classification tasks and face keypoint regression tasks. These tasks are combined by assigning different weights to act in each network at each stage. A face classification loss function $\mathcal{L}_{face}$ is defined as a cross-entropy loss function:

$$\mathcal{L}_{face} = y_f \log \hat{y}_f + (1-y_f)\log(1-\hat{y}_f),$$

wherein, $y_f$ represents a classification annotation of a training sample, the subscript f represents a face classification task; when a positive sample is input, $y_f=1$, otherwise, $y_f=0$; $\hat{y}_f$ is a face classification prediction result; log represents natural logarithm; and an angle classification loss function $\mathcal{L}_{angle}$ is defined as:

$$\mathcal{L}_{angle} = -\Sigma_{j=1}^{T} a_j \log S_j,$$

wherein, $a_j$ represents a rotation direction annotation of training data, when a rotation angle of an input sample falls near a j-th rotation angle, $a_j=1$, otherwise $a_j=0$; in training, $T=4$ represents four different rotation angle categories, $S_j$ represents a probability that the network predicts that the input sample falls at the j-th angle range; log represents natural logarithm; an Euclidean distance loss function is used for regression of the face bounding box, and regression targets of the bounding box include the following four terms, respectively representing relative offsets of four coordinates:

$$t_{x_1} = (x_1 - \hat{x}_1)/\hat{w}, \quad t_{y_1} = (y_1 - \hat{y}_1)/\hat{h},$$

$$t_{x_2} = (x_2 - \hat{x}_2)/\hat{w}, \quad t_{y_2} = (y_2 - \hat{y}_2)/\hat{h},$$

wherein, $t_{x_1}$ represents a relative offset of an upper left point's abscissa, $t_{y_1}$ represents a relative offset of the upper left point's ordinate, $t_{x_2}$ represents a relative offset of a lower right point's abscissa, $t_{y_2}$ represents a relative offset of the lower right point's ordinate, $\hat{w}$ and $\hat{h}$ represent predicted width and height, $(x_1, y_1)$ and $(x_2, y_2)$ respectively represent coordinates of the upper left point and coordinates of the lower right point of each face box in the training data, and $(\hat{x}_1, \hat{y}_1)$ and $(\hat{x}_2, \hat{y}_2)$ respectively represent the coordinates of the upper left point and the coordinates of the lower right point of the box predicted by the network.

It should be noted that, in the keypoint regression task of the present method, a penalty term for large-pose faces is introduced on the basis of the traditional Euclidean distance; this is mainly because, in the existing training data, the ratio of large-pose faces is often relatively low, which causes the models to pay insufficient attention to such samples, resulting in relatively large errors in the prediction results for these samples in the training.

Meanwhile, according to the relative position relationship of the labeled coordinates of the existing training data (such as left and right eyes, nose tip, and left and right mouth corner), samples of large-pose faces can be extracted. Therefore, in the present invention, the following keypoint loss function $\mathcal{L}_{land}$ is constructed to train the face keypoint positioning:

$$\mathcal{L}_{land} = \frac{1}{N}\sum_{n=1}^{N}\sum_{m=1}^{M} w_n(1.5 - \cos(\theta_n))\|d_m^n\|_2^2,$$

wherein, N represents the size of each cluster in the training process, M represents the number of keypoints on each face, $\theta_n$ represents an angle between a line connecting two eyes of the n-th face during training and a horizontal axis of the image, cos represents a Cosine trigonometric function, $d_m^n$ represents a distance between a predicted value and a true value of the m-th keypoint of the n-th face, and $\|*\|_2^2$ represents a second norm; $w_n$ represents a large-pose penalty term of the n-th training sample, which is calculated as follows: 1) connecting four keypoints other than the nose tip to form four bounding lines; 2) calculating a relative distance c from the nose tip to its nearest bounding line: 3) determining whether the nose tip exceeds the bounding, and 4) if the nose tip is within the bounding, then $w_n=1-c$, otherwise, $w_n=1$. This strategy of redefining weights allows the network to pay more attention on large-pose samples.

The angle arbitration mechanism is used to combine the face rotation angle prediction results of the preceding two networks. Transmission of wrong prediction results of the cascaded network structure is also cascaded, which will cause previous wrong results to be irrecoverable at a later stage. In the present method, the angle classification tasks of the preceding two networks are completely identical, both performing classification and prediction in four direction ranges, but is also different in that the input samples of the second-level network contain more positive samples and therefore have more credible prediction results. The angle arbitration mechanism combines the preceding two angle prediction results by providing a predefined threshold value. Specifically, when the prediction result of the second-level network is higher than the threshold, or when the two prediction results having the highest confidence respectively in the two networks are identical, the prediction of the second-level network is taken as the final prediction result; otherwise, whether there is an intersection between the prediction results with top two confidences in the two network are examined, and if so, the intersection is taken as the final prediction result.

(1) Data Set Used in the Present Invention;

FDDB (Vidit Jain and Erik Learned-Miller. 2010. FDDB: A Benchmark for Face Detection in Unconstrained Settings. Technical Report UM-CS-2010-009. University of Massachusetts, Amherst.) includes 2,845 images in natural environment, in which 5,171 face boxes are labeled, and is a universal data set for testing face detection, however, most of the faces have typical poses, that is, the rotation angle is small. In order to verify the rotation invariance of the method of the present invention, the images of the original data set have been rotated counterclockwise by 90°, 180°, and 270° respectively. After the rotation operation, the data, plus the rotation angles in the original data, can basically cover all angles in the entire plane. The present invention uses this data set to evaluate the face box detection effect.

AFLW (Martin Köstinger, Wohlhart P, Roth P M, et al. Annotated Facial Landmarks in the Wild: A large-scale, real-world database for facial landmark localization[C]// IEEE International Conference on Computer Vision Workshops, ICCV 2011 Workshops, Barcelona, Spain, Nov. 6-13, 2011. IEEE, 2011.) includes 25,993 faces, which exhibit diversity in pose, occlusion and illumination, etc. This dataset is used to test the keypoint detection effect of the present invention.

(2) Test Process;

The Caffe deep learning framework is applied in the test, and random gradient descent is applied for optimization during training. Specifically, the training sizes of the three sub-networks are set to be 400, 300, and 200, respectively; the initial learning rate is set to be 0.01, and after every 20,000 iterations, it is decrease progressively to one tenth of the original; a total number of iterations is 200,000; the weight attenuation parameter is set to be $5\times10^{-4}$; the momentum parameter is 0.9; and the PReLU is introduced as the activation function after the convolution operation and the full connection operation.

The training data are obtained from multiple data sources, wherein the data for face detection and angle classification are samples with typical poses from WIDER FACE. The rotation-in-plane angles of faces with such poses are between ±30°. The training data of the face keypoint are mainly from the CelebA data set. For the first network, the present invention randomly cuts out candidate boxes from the original images as training data; these candidate boxes are divided into a positive category, a negative category, and a partial category according to the intersection over union (IoU) with the ground truth box. Specifically, samples with IoU>0.7 belong to the positive category, samples with IoU<0.3 belong to the negative category, and samples with 0.4<IoU<0.7 belong to the partial category, wherein the samples of positive and negative categories are used to train the face/non-face binary classification task, while the samples of positive and partial categories are used to train the face candidate box regression and face rotation angle classification tasks. The training data of the second network are obtained with the same dividing strategy, but the data are obtained from the prediction output of the first network over the original data set. For the third-level network, keypoint-containing images, which are cut out by the preceding two networks from the CelebA data set, are used as training samples. During the training process, the ratio of the positive category, the negative category, the partial category, and keypoint data is set to be 2:3:1:2. In addition, in order to ensure a balanced distribution of training data of rotation angle classification, a random rotation layer is designed in the present invention. This layer is used to dynamically and randomly rotate the input face image during training, and at the same time, correspondingly transform its labels, so as to ensure that the proportions of the data of various angles are identical in every training process. It should be noted that, the random rotation layer will only rotate the input image by 0°, 90°, 180°, or 270°. Since the frontal face data themselves involve a small range of rotation angles, the training data can cover all rotation angles in the plane by introducing the random rotation layer; in addition, the introduction of this layer also greatly reduces the time for data preparation and the memory footprint during training.

Figure 2:
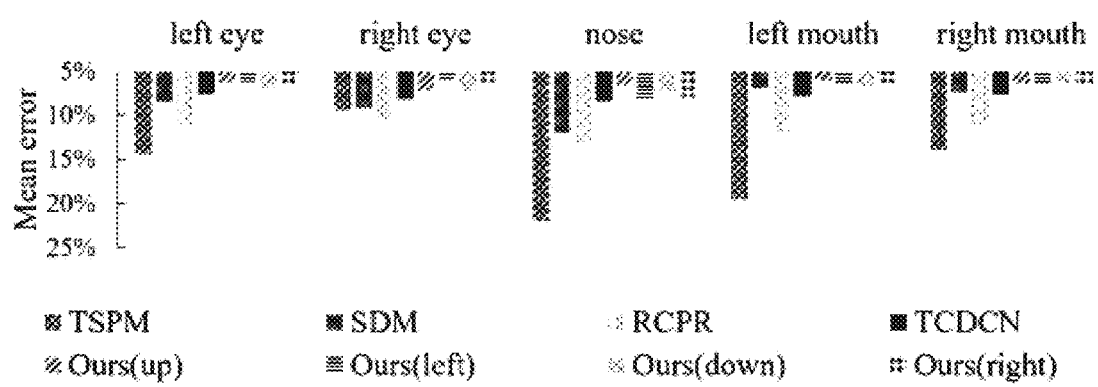
FIG. 2 shows test comparison results of the present invention on an AFLW data set.

(3) Test Result:

In order to evaluate the effectiveness of the present invention, face detection and keypoint positioning tests were performed with the above-mentioned data set. A comparison test was performed to compare the present invention with current mainstream face detection methods. For the face detection task, the universal target algorithms SSD (Liu W, Anguelov D, Erhan D, et al. SSD: Single Shot MultiBox Detector [J]. 2015.) and Faster-RCNN (Ren S, He K, Girshick R, et al. Faster R-CNN: Towards Real-Time Object Detection with Region Proposal Networks [J]. 2015.), which have higher complexity and better feature expression ability, along with other popular methods, were selected for the comparison test on the FDDB dataset. Results showed that the present method maintained a high recall rate at different rotation angles at a certain false detection rate, 1.8 percentage points higher on the same test set especially when compared with other cascaded neural networks such as PCN (Shi X, Shan S, Kan M, et al. Real-Time Rotation-Invariant Face Detection with Progressive Calibration Networks [J]. 2018). In the evaluation test for keypoint positioning, several keypoint detection methods had been selected for comparison on the same test set, and results were as shown in FIG. 2. The results showed that, the method of the present invention maintains a relatively low level in terms of normalized mean error and exhibited a relatively low error rate on keypoint test sets with different rotation angles, which proves the advantage of the present invention in rotation robustness.

In addition, in order to verify the validity of the jointly learning for the test results, an ablation experiment was performed to compare whether or not to jointly train face detection and angle classification, and compare whether to jointly train face detection and keypoint positioning. The experiment showed that, the introduction of the angle classification task and the keypoint positioning task helped to improve the effect of face detection; an explanation is that while the characteristics of the two tasks were shared, the multiple tasks which were related to each other improved the performance of a single task through the sharing of characteristics and weights. In order to verify the validity of the large-pose penalty loss function, the model trained using the present loss function and a model trained using ordinary L2 loss function were compared in terms of mean error on the AFLW data set. The test showed that the mean error of keypoints was reduced from 7.9% (before introduction of the function) to 7.5% (after the introduction of the function). The inference speed of the present method was measured on general-purpose CPU and GPU, which reached 23 FPS and 60 FPS, respectively.

Figure 3:
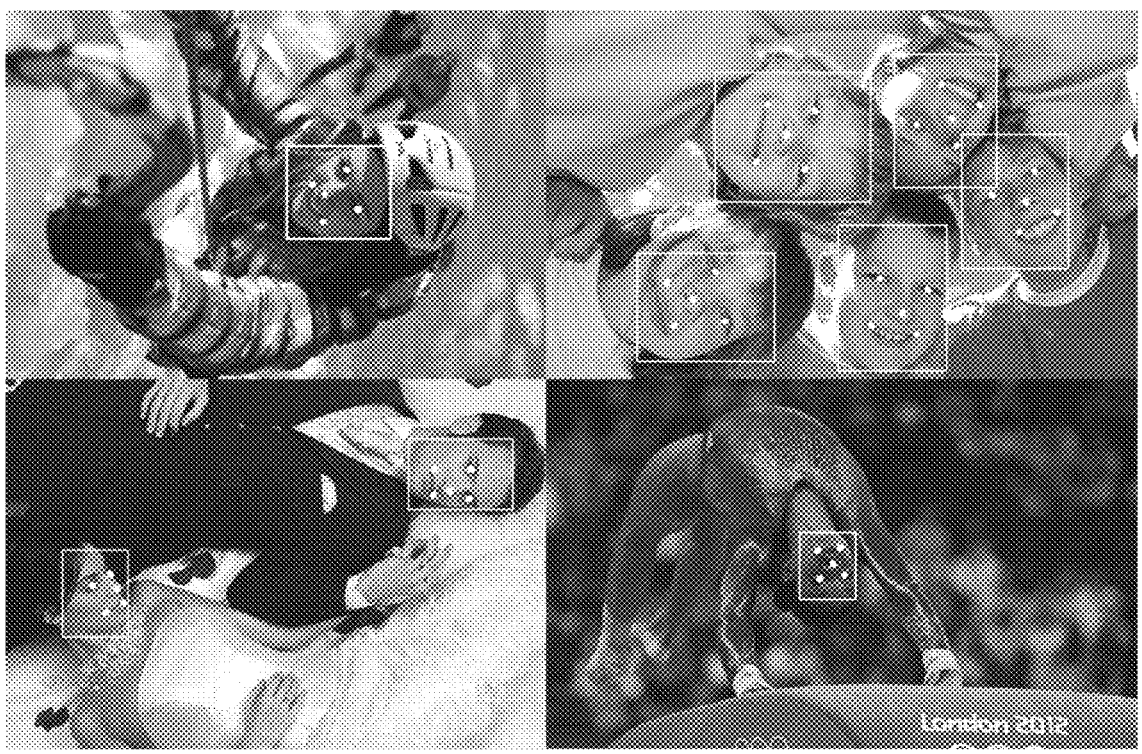
FIG. 3 shows a test effect of the present invention.

A novel rotation-robust face and keypoint detection method is proposed in the present invention. The rotation angle prediction, face detection, and keypoint positioning are realized simultaneously through three cascaded convolutional neural networks. The test results are as shown in FIG. 3. The angle arbitration mechanism and large-pose penalty loss function are introduced to improve the accuracy of angle prediction and improve the effect of keypoint positioning for large-pose faces.

The above detailed description is a specific description of feasible embodiments of the present invention. The embodiments are not intended to limit the patent scope of the present invention. Any equivalent implementation or modification that does not depart from the present invention should be included in the scope of the present invention.

What is claimed is:

1. A face detection method comprising the following steps:
    step 1: scaling an input image to a plurality of images of various sizes according to proportions by an image pyramid; passing a plurality of resultant images through a first-level network in a sliding window manner, so as to predict a plurality of face coordinates and a plurality of face confidences and provide a plurality of face orientation prediction results of the first-level network; filtering out a plurality of negative samples by a plurality of confidence rankings, and sending a plurality of remaining image patch samples to a second-level network after filtering out the plurality of negative samples;
    step 2: through the second-level network, further filtering out a plurality of non-face samples, applying a regression to obtain precise position coordinates, and providing a plurality of face orientation prediction results of the second-level network;
    step 3: through an angle arbitration mechanism, combining the plurality of face orientation prediction results of the first-level network and the plurality of face orientation prediction results of the second-level network to make a final arbitration for a rotation angle of each image patch sample; and
    step 4: rotating the each image patch sample upright according to an arbitration result made by the angle arbitration mechanism, and sending to a third-level network for a final tuning so as to predict positions of a plurality of keypoints;
    wherein, the first-level network and the second-level network each comprises a plurality of training tasks for a face classification task or a non-face classification task, a face bounding box regression task, and an angle classification task, the third-level network comprises a plurality of training tasks for a face classification task or a non-face classification task, a face bounding box regression tasks, and a plurality of face keypoint regression tasks;
    A face classification loss function $\mathcal{L}_{face}$ is defined as a cross-entropy loss function:

$$\mathcal{L}_{face}=y_f \log \hat{y}_f+(1-y_f)\log(1-\hat{y}_f),$$

wherein, $y_f$ represents a classification annotation of a training sample, subscript f represents the face classification task; when a positive sample is input, $y_f=1$, otherwise, $y_f=0$; $\hat{y}_f$ is a face classification prediction result; log represents natural logarithm; and an angle classification loss function $\mathcal{L}_{angle}$ is defined as:

$$\mathcal{L}_{angle}=-\Sigma_{j=1}^{T}a_j \log S_j,$$

wherein, $a_j$ represents a rotation direction annotation of a plurality of training data, when a rotation angle of an input sample falls near a j-th rotation angle, $a_j=1$, otherwise $a_j=0$; in training, T=4, T represents four different rotation angles; $S_j$ represents a probability wherein a network predicts the input sample falls at the j-th angle; log represents natural logarithm; an Euclidean distance loss function is used for a regression of the face bounding box, and a plurality of regression targets of the face bounding box comprises the following four terms, respectively representing a plurality of relative offsets of four coordinates:

$$t_{x_1}=(x_1-\hat{x}_1)/\hat{w}, \quad t_{y_1}=(y_1-\hat{y}_1)/\hat{h},$$

$$t_{x_2}=(x_2-\hat{x}_2)/\hat{w}, \quad t_{y_2}=(y_2-\hat{y}_2)/\hat{h},$$

wherein, $t_{x_1}$ represents a relative offset of an upper left point's abscissa, $t_{y_1}$ represents a relative offset of an upper left point's ordinate, $t_{x_2}$ represents a relative offset of a lower right point's abscissa, $t_{y_2}$ represents a relative offset of a lower right point's ordinate, $\hat{w}$ and $\hat{h}$ represent predicted width and height, $(x_1, y_1)$ and $(x_2, y_2)$ respectively represent a plurality of coordinates of the upper left point and a plurality of coordinates of the lower right point of each face bounding box in the plurality of training data, and $(\hat{x}_1, \hat{y}_1)$ and $(\hat{x}_2, \hat{y}_2)$ respectively represent the plurality of coordinates of the upper left point and the plurality of coordinates of the lower right point of the face bounding box predicted by the network;

a plurality of face keypoint positions are trained by a following loss function $\mathcal{L}_{land}$.

$$\mathcal{L}_{land} = \frac{1}{N} \sum_{n=1}^{N} \sum_{m=1}^{M} w_n (1.5 - \cos(\theta_n)) \|d_m^n\|_2^2,$$

wherein, N represents a size of each cluster in a training process, M represents a plurality of number of keypoints on each face, $\theta_n$ represents an angle between a line connecting two eyes of an n-th face during the training and a horizontal axis of the input image, cos represents a Cosine trigonometric function, $d_m^n$ represents a distance between a predicted value and a true value of an m-th keypoint of the n-th face, and $\|*\|_2^2$ represents a second norm; $w_n$ represents a large-pose penalty term of an n-th training sample, wherein the large-pose penalty term is calculated as follows: 1) connecting four keypoints other than a nose tip to form four bounding lines; 2) calculating a relative distance c from the nose tip to the nose tip's nearest bounding line; 3) determining whether the nose tip exceeds the bounding line, and 4) if the nose tip is within the bounding line, then $w_n=1-c$, otherwise, $w_n=1$.

2. The face detection method according to claim 1, wherein a threshold is preset in the angle arbitration mechanism; when the plurality of face orientation prediction results of the second-level network are higher than the threshold, or when a highest confidence of the plurality of face orientation prediction results of the second-level network is the same as a highest confidence of the plurality of face orientation prediction results of the first-level network, the face orientation prediction result is taken as a final prediction result; otherwise, whether there is an intersection between the plurality of face orientation prediction results with top two confidences in the first-level network and the plurality of face orientation prediction results with top two confidences in the second-level network are examined, and an intersection is taken as the final prediction result.

3. The face detection method according to claim 1, wherein a face orientation is facing up, facing down, facing left, or facing right.

* * * * *